United States Patent
Mulloy et al.

(10) Patent No.: US 7,150,151 B2
(45) Date of Patent: Dec. 19, 2006

(54) METHOD OF CONTROLLING THE EXHAUST GAS TEMPERATURE FOR AFTER-TREATMENT SYSTEMS ON A DIESEL ENGINE USING A VARIABLE GEOMETRY TURBINE

(75) Inventors: John M. Mulloy, Columbus, IN (US); Sam Pringle, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 11/070,491

(22) Filed: Mar. 2, 2005

(65) Prior Publication Data

US 2006/0010864 A1    Jan. 19, 2006

Related U.S. Application Data

(63) Continuation of application No. 10/840,057, filed on May 6, 2004, which is a continuation-in-part of application No. 10/717,232, filed on Nov. 19, 2003, now Pat. No. 6,931,849, which is a continuation-in-part of application No. 10/659,857, filed on Sep. 11, 2003, now abandoned.

(30) Foreign Application Priority Data

Nov. 19, 2002   (GB)   ................................ 0226943.9

(51) Int. Cl.
F02D 23/00    (2006.01)
F01N 3/00    (2006.01)
F01D 17/12    (2006.01)
F01N 5/00    (2006.01)
F01D 17/16    (2006.01)
F01D 17/14    (2006.01)

(52) U.S. Cl. ........................... 60/602; 60/282; 415/158

(58) Field of Classification Search .................. 60/602, 60/274, 277, 282; 415/158, 155, 160
See application file for complete search history.

(56) References Cited

U.S. PATENT DOCUMENTS

| | | | |
|---|---|---|---|
| 2,739,782 A | * | 3/1956 | White ........................ 415/158 |
| 4,835,963 A | | 6/1989 | Hardy ......................... 60/602 |
| 4,927,325 A | | 5/1990 | Yano .......................... 415/163 |
| 5,044,880 A | | 9/1991 | McKean ..................... 415/158 |
| 5,050,376 A | | 9/1991 | Stiglic et al. ................. 60/274 |
| 5,522,697 A | * | 6/1996 | Parker et al. ............... 415/158 |
| 6,203,272 B1 | | 3/2001 | Walsham ..................... 415/158 |
| 6,256,991 B1 | | 7/2001 | Schmidt et al. ............... 60/602 |
| 6,269,643 B1 | | 8/2001 | Schmidt et al. ............... 60/602 |
| 6,276,139 B1 | | 8/2001 | Moraal et al. ............. 60/605.2 |
| 6,314,735 B1 | | 11/2001 | Kolmanovsky et al. ....... 60/602 |
| 6,401,457 B1 | | 6/2002 | Wang et al. .................. 60/602 |
| 6,418,719 B1 | | 7/2002 | Terry et al. ................... 60/602 |
| 6,523,345 B1 | | 2/2003 | Scherngell et al. ........... 60/602 |
| 6,594,996 B1 | | 7/2003 | Yang ........................... 60/602 |

(Continued)

FOREIGN PATENT DOCUMENTS

EP    1120546 A    8/2001

(Continued)

*Primary Examiner*—Thai-Ba Trieu
(74) *Attorney, Agent, or Firm*—J. Bruce Schelkopf, Esq.; Krieg DeVault LLP

(57) ABSTRACT

A method for controlling a variable geometry turbine of a turbocharger to increase the temperature of the exhaust gas delivered to an after-treatment system. In one form the method includes reducing a fluid flow area to the turbine below a normal size and bypassing a portion of the exhaust gas around a plurality of guide vanes.

18 Claims, 12 Drawing Sheets

U.S. PATENT DOCUMENTS

| | | | |
|---|---|---|---|
| 6,609,372 B1 | 8/2003 | Maddock et al. | 60/602 |
| 6,619,261 B1 | 9/2003 | Wang et al. | 60/602 |
| 6,625,986 B1 | 9/2003 | Mazaud et al. | 60/602 |
| 6,652,224 B1 * | 11/2003 | Mulloy et al. | 415/158 |
| 6,669,442 B1 | 12/2003 | Jinnai et al. | 415/160 |
| 6,679,057 B1 | 1/2004 | Arnold | 60/602 |
| 6,687,601 B1 | 2/2004 | Bale et al. | 60/602 |
| 6,694,733 B1 | 2/2004 | Lombard et al. | 60/602 |
| 6,779,971 B1 | 8/2004 | Garrett | 415/156 |
| 6,851,256 B1 | 2/2005 | Chamoto et al. | 60/602 |
| 6,932,565 B1 * | 8/2005 | Garrett et al. | 415/158 |
| 2002/0170287 A1 | 11/2002 | Hirota et al. | 60/295 |
| 2003/0182940 A1 | 10/2003 | Nishiyama et al. | 60/602 |

FOREIGN PATENT DOCUMENTS

| | | | |
|---|---|---|---|
| EP | 1435434 A | 7/2004 | |
| JP | 61001829 A | 1/1986 | 60/602 |
| JP | 03249305 A | 11/1991 | 415/155 |
| JP | 06235319 A | 8/1994 | 60/282 |
| JP | 2000220445 A | 8/2000 | |
| WO | WO 2004/027219 A | 4/2004 | |

* cited by examiner

METHOD OF CONTROLLING THE EXHAUST GAS TEMPERATURE FOR AFTER-TREATMENT SYSTEMS ON A DIESEL ENGINE USING A VARIABLE GEOMETRY TURBINE

CROSS-REFERENCE TO RELATED APPLICATIONS

The present application is a continuation of U.S. patent application Ser. No. 10/840,057 filed May 6, 2004, which is a continuation-in-part of U.S. patent application No. 10/717,232 filed Nov. 19, 2003 now U.S. Pat. No. 6,931,849, which is a continuation-in-part of U.S. patent application Ser. No. 10/659,857 filed Sep. 11, 2003 now abandoned, which claims priority to British Patent Application No. 0226943.9 filed Nov. 19, 2002. Each of the above applications is incorporated herein by reference.

BACKGROUND OF THE INVENTION

The present invention relates generally to a method of controlling a variable geometry turbine. More particularly, but not exclusively, the present invention relates to a method for controlling a variable geometry turbocharger to affect a diesel engines exhaust gas temperature to a desired level for after-treatment systems.

After-treatment system performance is directly related to the temperature of the exhaust gas that passes through it. Designers of after-treatment systems recognize that for desired performance the exhaust gas temperature must be above a threshold temperature under all operating conditions and ambient conditions. The threshold temperature is generally recognized as being within a range of about 500° F. to about 700° F. The operation of the after-treatment system below the threshold temperature range will cause the after-treatment system to build up undesirable accumulations. The undesirable accumulations must be burnt off in a regeneration cycle to allow the after-treatment system to return to the designed performance levels. Further, prolonged operation of the after-treatment system below the threshold temperature without regeneration will disable the after-treatment system and cause the engine to become non-compliant with government regulations.

It is recognized that the exhaust gas temperatures for the majority of the operating range of a diesel engine will generally be above the desired threshold temperature. However, light load conditions and/or cold ambient temperatures often cause the exhaust gas temperature to fall below the desired threshold temperatures.

The present inventions provide a novel and non-obvious method for controlling the variable geometry turbocharger to increase the exhaust gas temperature to the desired threshold temperature for the after-treatment system.

SUMMARY OF THE INVENTION

One form of the present invention contemplates a method comprising: operating a turbocharger including a variable geometry turbine having an inlet passage to the turbine with a fluid flow area, the fluid flow area having a normal size for an internal combustion engine operating in a normal operating range; reducing the size of the fluid flow area from the normal size to a reduced size for exhaust gas heating; and bypassing a portion of the exhaust gas entering the inlet passage around the guide vanes of the variable geometry turbine.

Another form of the present invention contemplates a method comprising: operating a turbocharger including a moving nozzle vane variable geometry turbine, the turbine including an inlet passage having an exhaust gas flow area adapted for the flow of an exhaust gas, the exhaust gas flow area having a first size configured for an internal combustion engine operating in a normal operating range; determining a first temperature of the exiting exhaust gas of the variable geometry turbocharger; moving a nozzle ring within the variable geometry turbine to decrease the exhaust gas flow area from the first size to a reduced size if the first temperature does not satisfy a threshold temperature condition; and, bypassing a portion of the exhaust gas entering the inlet passage around a plurality of vanes of the variable geometry turbine.

Yet another form of the present invention contemplates a method comprising: operating a turbocharger including a swing vane variable geometry turbine having a plurality of guide vanes, the turbine including an inlet passage having an exhaust gas flow area adapted for the flow of exhaust gas, the exhaust gas flow area having a first area for an internal combustion engine operating in a normal operating range; determining a first temperature of the exhaust gas proximate the outlet of the variable geometry turbocharger; swinging the plurality of guide vanes within the variable geometry turbine to reduce the size of the exhaust gas flow area from the first area to a reduced area if the first temperature does not satisfy a threshold temperature; and, flowing a portion of the exhaust gas entering the inlet passage around the plurality of guide vanes of the variable geometry turbine.

One object of the present invention is to provide a unique method for controlling a variable geometry turbocharger.

Related objects and advantages of the present invention will be apparent from the following description.

DESCRIPTION OF THE PREFERRED EMBODIMENTS

Figure 1:
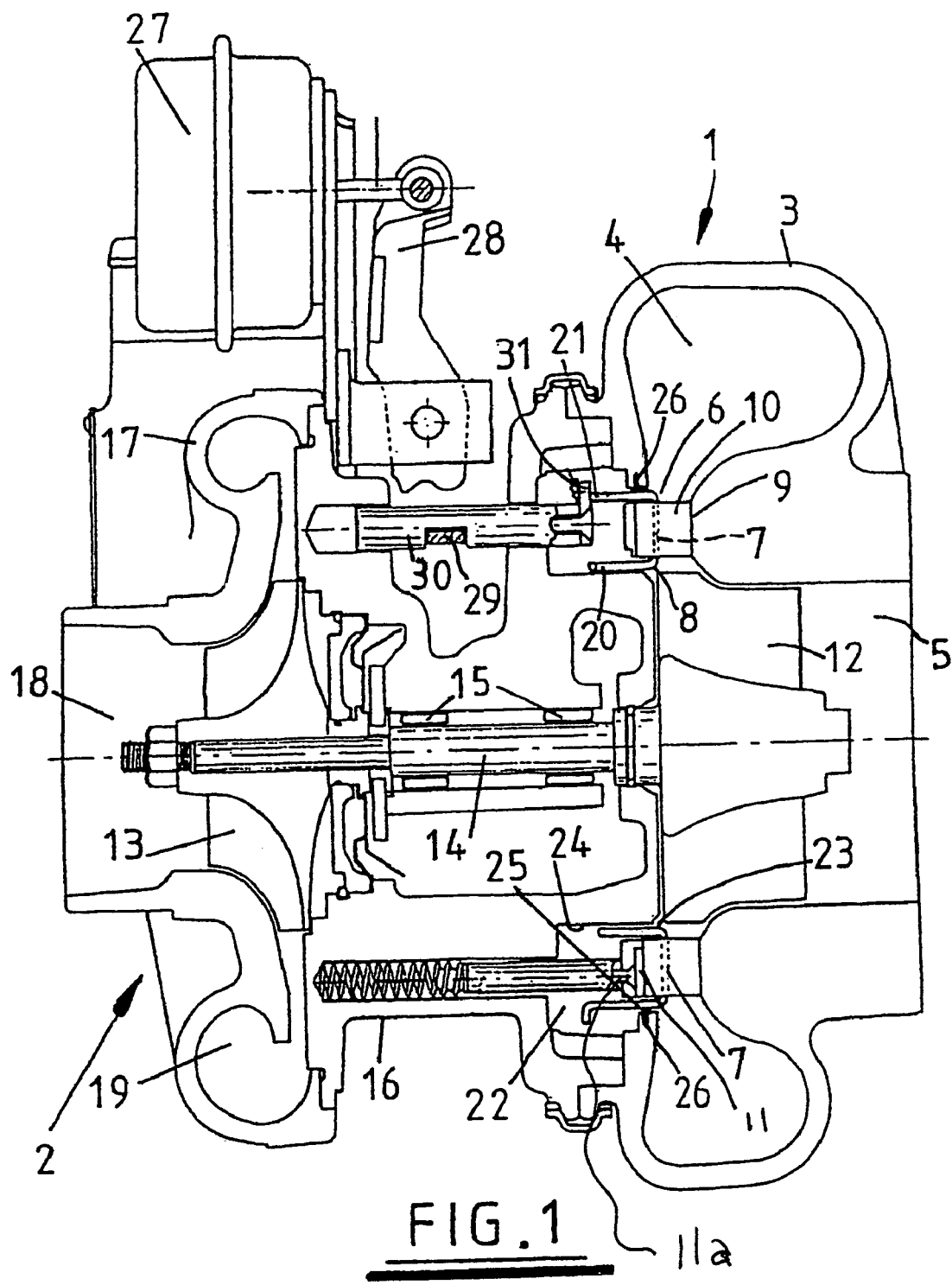
FIG. 1 is a cross-sectional illustration of a prior art variable geometry turbocharger including a nozzle ring.

For the purposes of promoting understanding of the principles of the invention, reference will be made to the embodiments illustrated in the drawings and specific language will be used to describe the same. It will nevertheless be understood that no limitation of the scope of the invention is hereby intended and alterations and modifications in the illustrated device, and further applications of the principles of the present invention as illustrated herein being contemplated as would normally occur to one skilled in the art to which the invention relates.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suite varying engine demands. The present application contemplates the utilization of the present invention with all types of variable geometry turbines, including but not limited to moving nozzle vane and swing vane.

Conventionally, the variable geometry turbine is used to manage air flow into the internal combustion engine under the guidance of an engine control unit (ECU). A turbocharger nozzle ring is generally utilized to guide exhaust gas through the turbine stage in order to control the engine air flow delivered via the turbocharger compressor stage. While the present application was developed for compression ignition diesel engines, there is also contemplated herein the application to spark ignited engines and engines running on any types of fuels be it liquid or gaseous.

Referring to FIG. 1, this illustrates a known turbocharger as disclosed in U.S. Pat. No. 5,044,880. The turbocharger comprises a turbine stage 1 and a compressor stage 2. The turbine stage 1 is a variable geometry turbine comprising a turbine housing 3 defining a volute or inlet chamber 4 to which exhaust gas from an internal combustion engine (not shown) is delivered. The exhaust gas flows from the inlet chamber 4 to an outlet passageway 5 via an annular inlet passageway 6 defined on one side by a radial wall 7 of a moveable annular member 8, referred to herein as a nozzle ring, and on the other side by a facing radial wall 9 of the housing 3. An array of nozzle vanes 10 extend through slots in the nozzle ring 8 across the inlet passageway 6 from a vane support ring 11 which is mounted on support pins 11a. The arrangement is such that the degree to which the vanes 10 extend across the inlet passageway 6 is controllable independently of the nozzle ring 8 and will not be described in detail here.

Figure 1A:
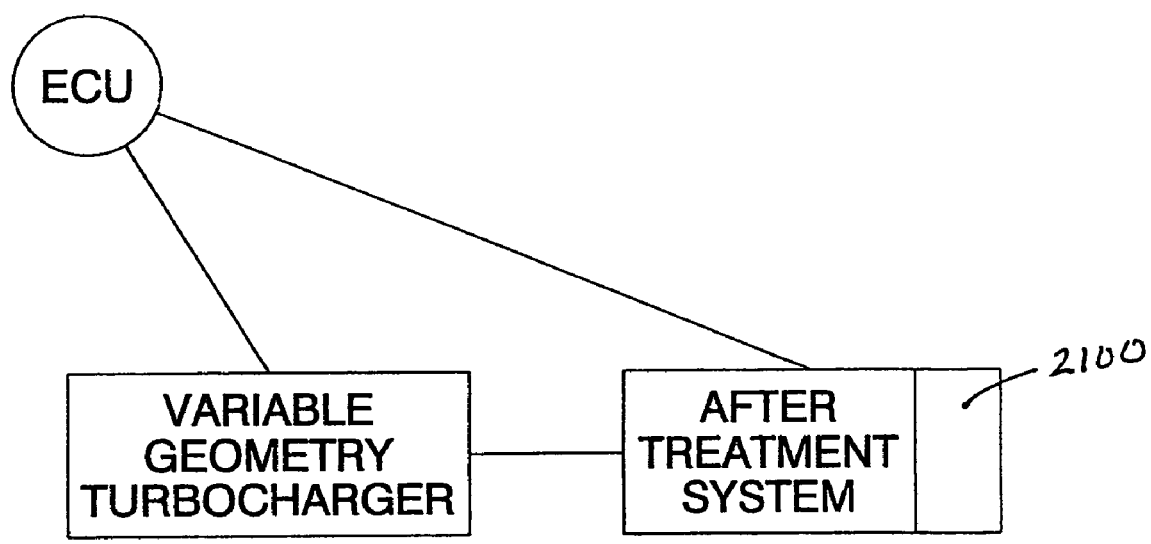
FIG. 1a is a schematic illustration of a turbocharger coupled in flow communication with an after-treatment system.

Gas flowing from the inlet chamber 4 to the outlet passageway 5 passes over a turbine wheel 12 which as a result drives a compressor wheel 13 via turbocharger shaft 14 which rotates on bearing assemblies 15 located within a bearing housing 16 which connects the turbine housing 2 to a compressor housing 17. Rotation of the compressor wheel 13 draws in air through a compressor inlet 18, and delivers compressed air to the intake of the engine (not shown) via an outlet volute 19. With reference to FIG. 1a, there is schematically illustrated the passage of the exhaust gas from outlet passageway 5 to an after-treatment system. A variety of after-treatment systems as are believed generally known to one of ordinary skill in the art is contemplated herein. The types of after-treatment systems contemplated herein are designed to remove particulates, nitrogen-oxide compounds, and other regulated emissions.

In one form the after treatment system includes a temperature detector 2100 for determining the temperature within the after-treatment system. The temperature detector may directly determine the temperature as though a sensor or may determine the temperature through calculations and/or iterations in an algorithm(s) or software(s) routine(s). The temperature detector 2100 determines the temperature within the system and provides a signal to the ECU to facilitate control of the variable geometry turbine to change the exhaust gas temperature as needed. Further, the present application contemplates that the temperature determination could occur at other locations such as, but not limited to the fluid flow outlet of the turbine. It will be appreciated that the bearing housing also houses oil supply and seal arrangements, the details of which are not necessary for an understanding of the present invention.

The nozzle ring 8 comprises a radially extending annular portion defining the radial wall 7, and axially extending inner and outer annular flanges 20 and 21 respectively which extend into an annular cavity 22 provided in the turbine housing 3. With the turbine construction shown in the figures, the majority of the cavity 22 is in fact defined by the bearing housing 16—this is purely a result of the construction of the particular turbocharger to which the invention is in this instance is applied and for the purposes of the present invention no distinction is made between the turbine housing and bearing housing in this regard. The cavity 22 has a radially extending annular opening 23 defined between radially inner and outer annular surfaces 24 and 25. A seal ring 26 is located in an annular groove provided in outer annular surface 25 and bears against the outer annular flange 21 of the nozzle ring 8 to prevent exhaust gas flowing through the turbine via the cavity 22 rather than the inlet passageway 6.

A pneumatically operated actuator 27 is operable to control the position of the nozzle ring 8 via an actuator output shaft 28 which is linked to a stirrup member 29 which in turn engages axially extending guide rods 30 (only one of which is visible in the figures) which support the nozzle ring 8 via linking plates 31. However, the movement of the nozzle ring 8 could be controlled by any suitable actuation means. The actuator means contemplated herein include, but are not limited to pneumatic, electric or hydraulic devices. Accordingly, by appropriate control of the actuator 27 the axial position of the guide rods and thus of the nozzle ring 8 can be controlled. FIG. 1 shows the nozzle ring 8 in its fully open position in which the inlet passageway 6 is at its maximum width.

A variable geometry turbine such as that disclosed in FIG. 1 can be operated to close the inlet passageway 6 to a minimum width when needed for the present invention. The minimum width for the present system to control exhaust gas temperatures is smaller than the minimum width for normal engine operating conditions. More particularly, in one form the minimum width for controlling exhaust gas temperature is anticipated to be within a range of about 0 millimeters to about 4 millimeters. In contrast, in one form the nozzle ring 8 is generally closed to provide a minimum width/gap of about 3 millimeters to about 12 millimeters for an engine operating in the normal engine operating range. However, the size of the minimum widths is also generally dependent on the size and configuration of the turbine. In reviewing the minimum widths for engines operating in the normal range, it is appropriate to utilise about 25% to 100% of the maximum gap width. In setting the minimum gap width for controlling the heating of the exhaust gas temperature, in one form it is appropriate to use about 0% to 25% of the maximum gap width. However, other percentages are contemplated herein. The minimum width/gap or throat area will be utilised herein in defining parameters related to the fluid flow through the annular inlet passageway 6.

Figure 2A:
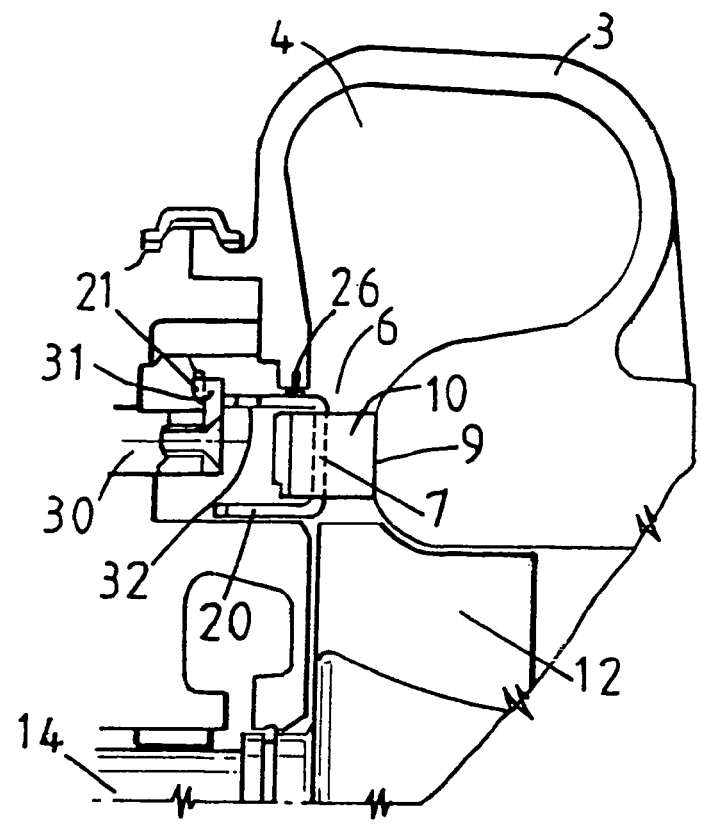
FIGS. 2a and 2b illustrate a modification of the turbocharger of FIG. 1 in accordance with the present invention.
Figure 2B:
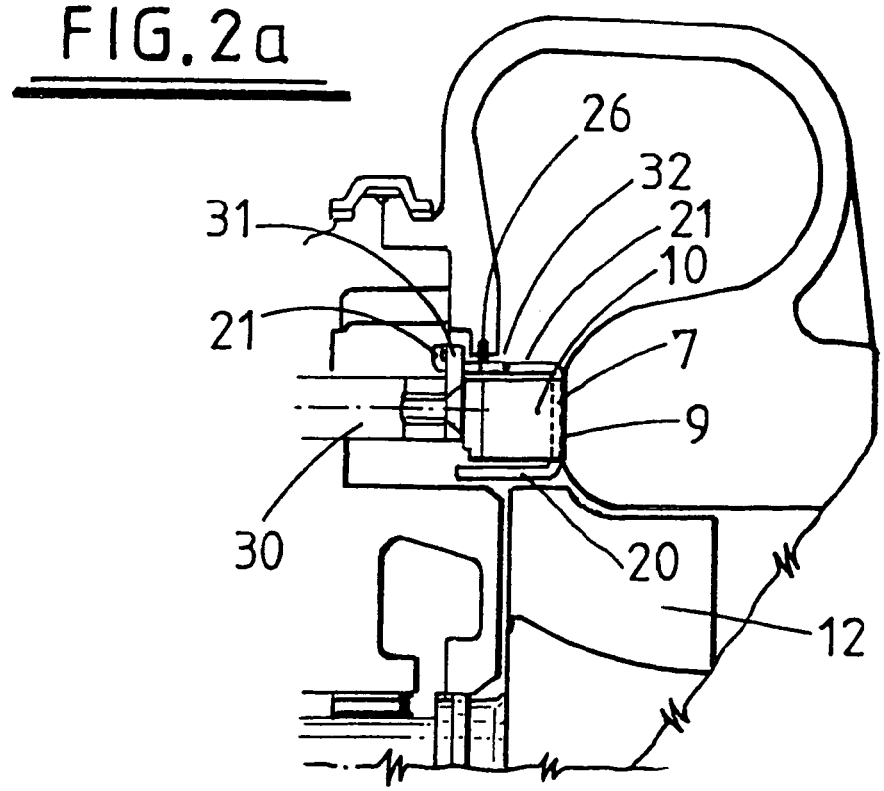

FIGS. 2a and 2b illustrate a modification of the turbocharger of FIG. 1 in accordance with the present application. Only those parts of the turbine which need to be described for an understanding of the invention are shown in FIGS. 2a and 2b, which are enlargements of the nozzle ring/inlet passageway region of the turbocharger showing the nozzle ring in fully open and fully closed positions, respectively. The nozzle ring 8 is modified by the provision of a circumferential array of apertures 32 provided through the radially outer flange 21. The positioning of the apertures 32 is such that they lie on the side of the seal ring 26 remote from the inlet passageway 6 (as shown in FIG. 2a) except when the nozzle ring 8 approaches the closed position, at which point the apertures 32 pass the seal 26 (as shown in FIG. 2b). This opens bypass flow path allowing some exhaust gas to flow from the inlet chamber 4 to the turbine wheel 12 via the cavity 22 rather than through the inlet passageway 6. The exhaust gas flow that bypasses the inlet passageway 6, and nozzle vanes 10, will do less work than the exhaust gas flow through the inlet passageway 6 particularly since this is turned in a tangential direction by the vanes 10. In other words, as soon as the apertures 32 are brought into communication with the inlet passageway 6 there is an immediate reduction in the efficiency of the turbocharger and corresponding drop in compressor outflow pressure (boost pressure) with an accompanying drop in engine cylinder pressure.

Thus, with the present invention the provision of the inlet bypass apertures 32 will have no effect on the efficiency of the turbocharger under normal operating conditions but when the turbine is operated in an exhaust gas heating mode, and the inlet passageway is reduced to its minimum, the apertures will 32 facilitate a greater reduction in inlet passageway size than is possible with the prior art without over pressurising the engine cylinders. More specifically, in one form of the present invention, the bypass apertures 32 are designed to be normally closed during the normal engine operating conditions.

It will be appreciated that the efficiency reducing effect on the turbocharger can be predetermined by appropriate selection of the number, size, shape and position of the apertures 32.

Figure 3B:
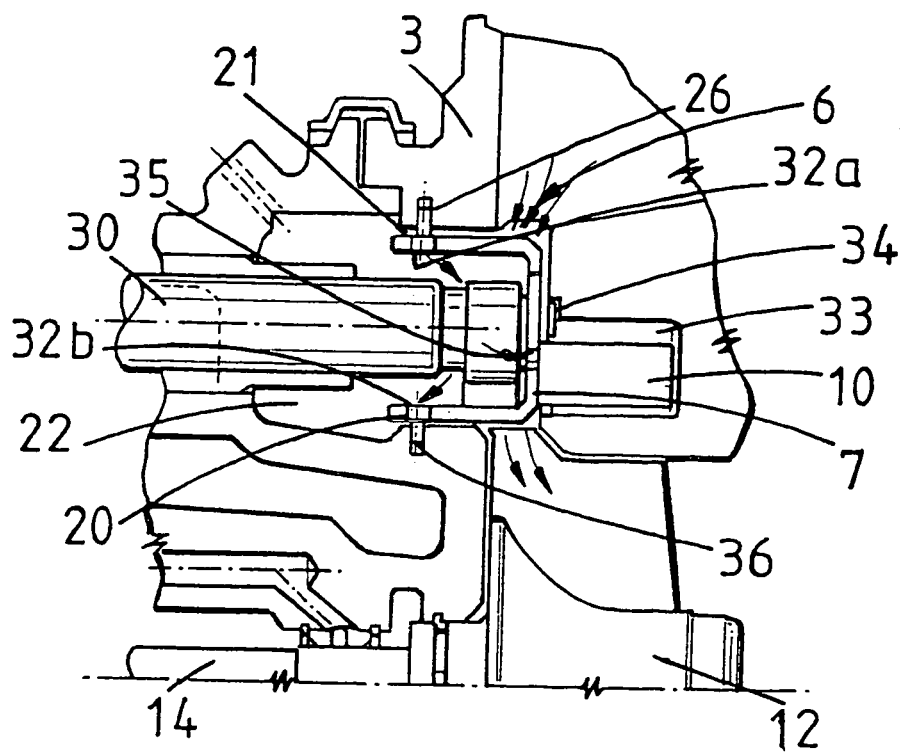
FIGS. 3a and 3b illustrate a second embodiment of the present invention.
Figure 3A:
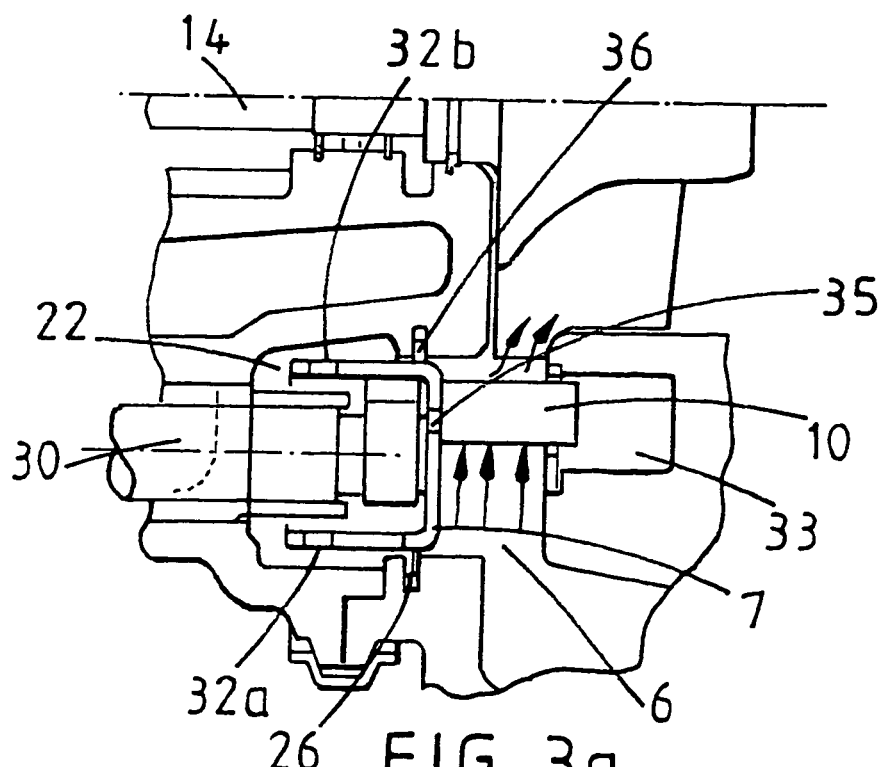

FIGS. 3a and 3b illustrate a second embodiment of a variable geometry turbine. As with FIGS. 2a and 2b, only detail of the nozzle ring/inlet passageway region of the turbine is illustrated. Where appropriate, the same reference numerals are used in FIGS. 3a and 3b as used in FIGS. 1 and 2. FIGS. 3a and 3b illustrate application of the present technology to an otherwise conventional turbine, which differs from the turbine of FIG. 1 in several respects. Firstly, the nozzle vanes 10 are mounted on the nozzle ring 8 and extend across the inlet passageway 6 and into a cavity 33 via respective slots provided in a shroud plate 34 which together with the radial wall 7 of the nozzle ring 8 defines the width of the inlet passageway 6. This is a well known arrangement.

Secondly, in accordance with the teaching of European patent number 0 654 587, pressure balancing apertures 35 are provided through the radial wall 7 of the nozzle ring 8 and the inner annular flange 20 is sealed with respect to the housing 3 by a respective seal ring 36 located in an annular groove provided in the radially inner annular portion 24 of the housing 3. The provision of the apertures 35 ensures that pressure within the cavity 22 is equal to the static pressure applied to the radial face 7 of the nozzle ring 8 by exhaust gas flow through the inlet passageway 6. This reduces the load on the nozzle ring with an increase in the accuracy of control of the position of the nozzle ring 8, particularly as the inlet passageway 6 is reduced towards its minimum width.

In view of the provision of a radially inner seal ring 36, application of the present invention requires provision of gas bypass passages 32a in the inner annular flange 20 of the nozzle ring 8. The passages 32a are positioned relative to the seal ring 26 so that they open into communication with the inlet passageway side of the seal ring 26 at the same time as passages 32b in outer annular flange 21 thereby providing a bypass flow passage through the cavity 22 achieving exactly the same effect as described above in relation to the embodiment of FIGS. 2a and 2b.

Alternatively the outer passages 32b can be omitted, relying on the pressure balancing apertures 35 to provide a bypass flow path in conjunction with inner passages 32a.

Figure 4A:
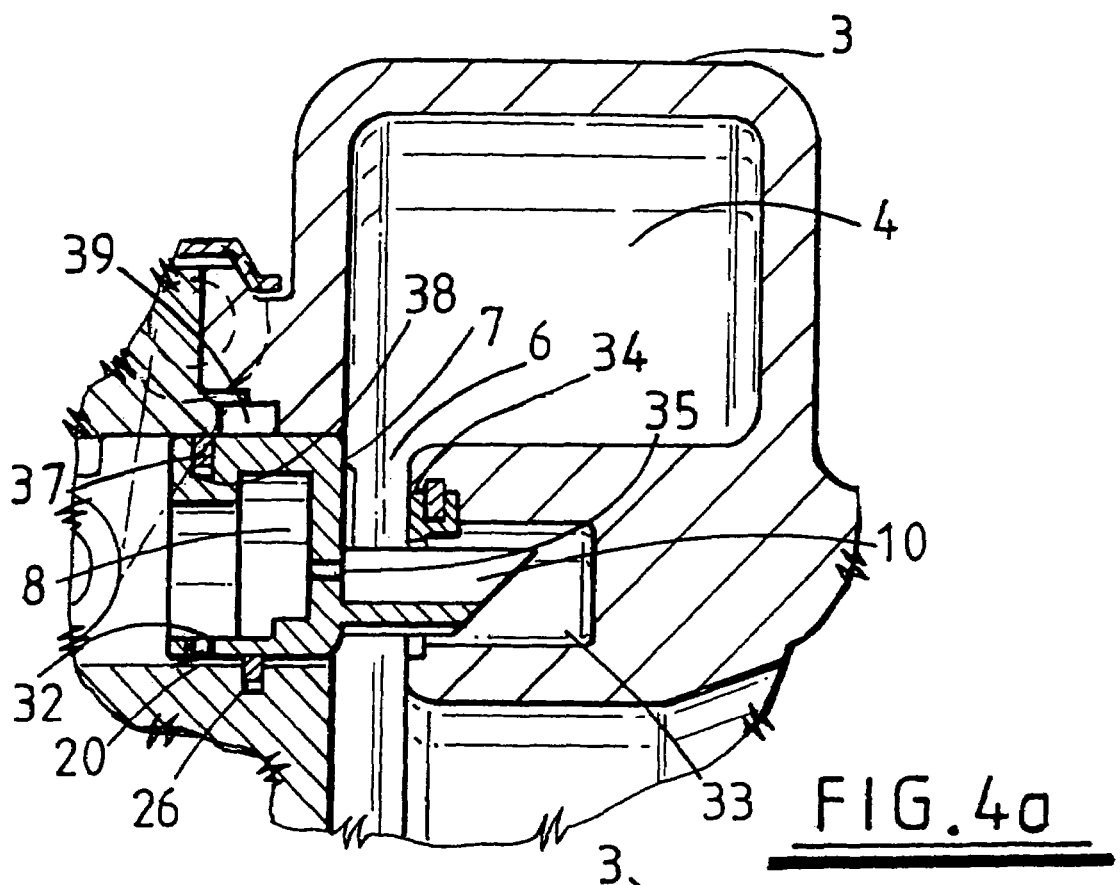
FIGS. 4a and 4b schematically illustrate a third embodiment of the present invention.
Figure 4B:
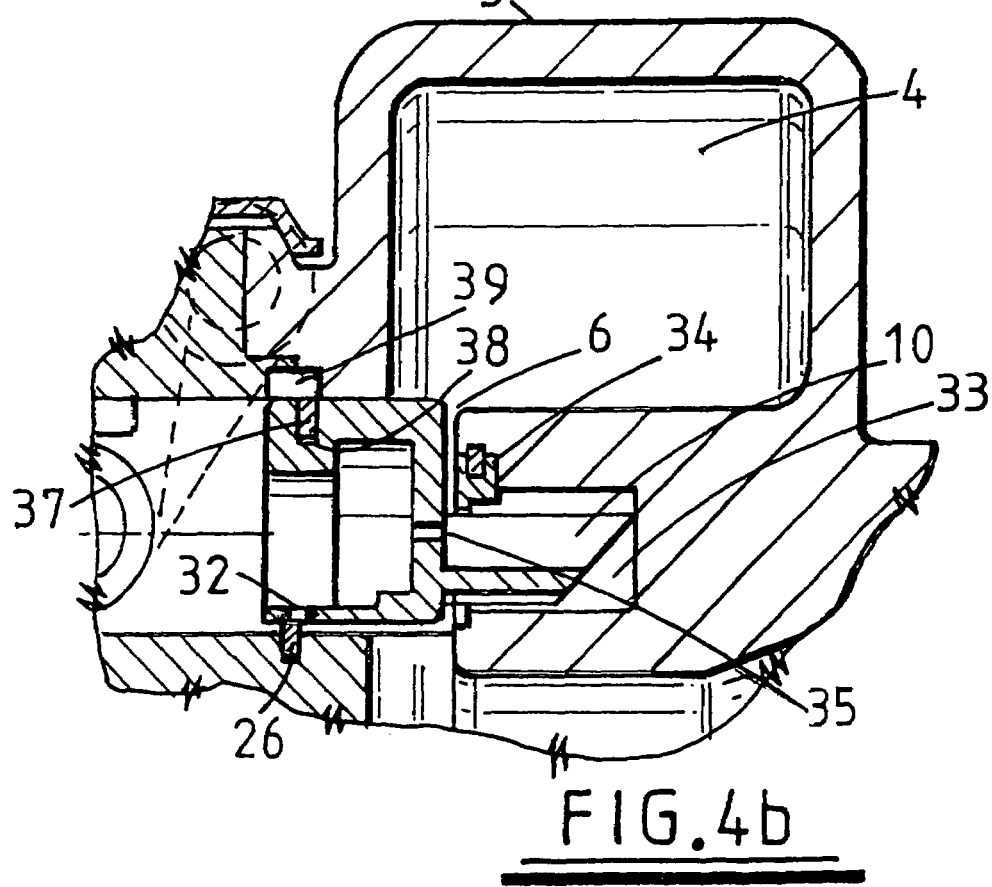
Figure 5:
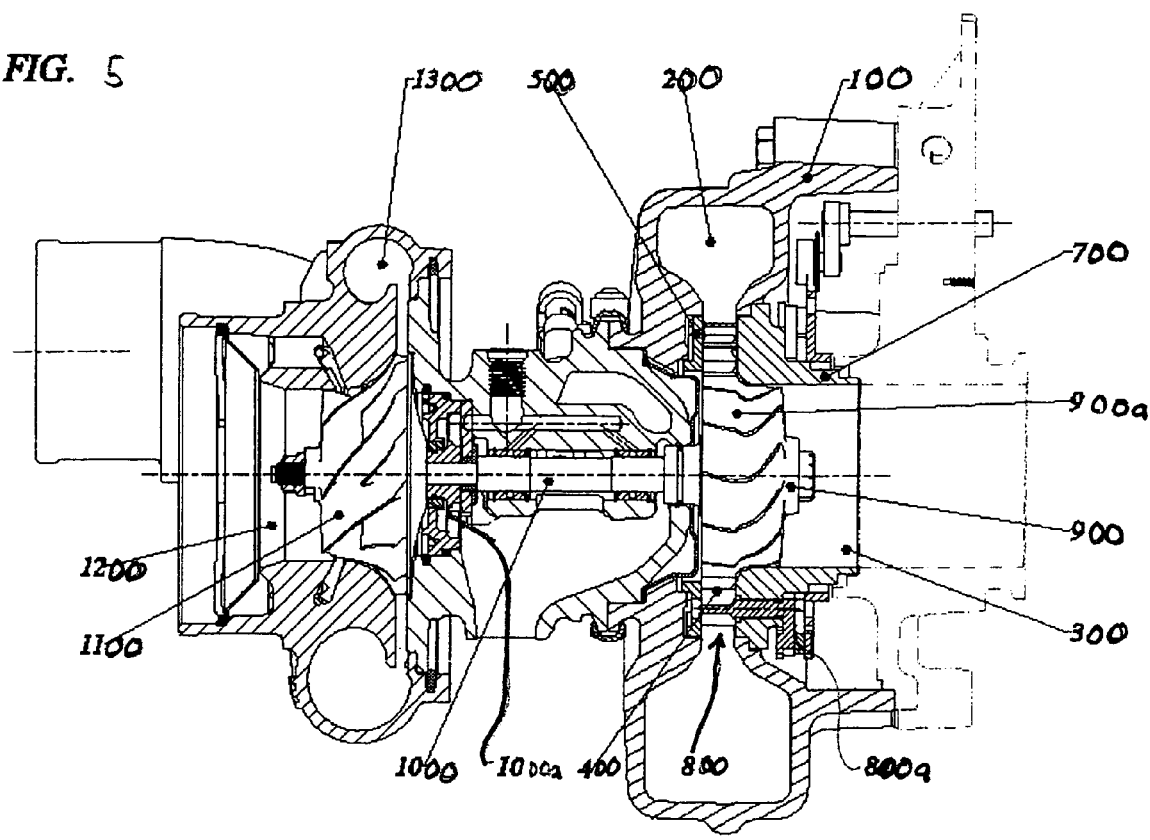
FIG. 5 is an axial cross section of a swing vane variable geometry turbine with the vanes in the closed position.
Figure 6:
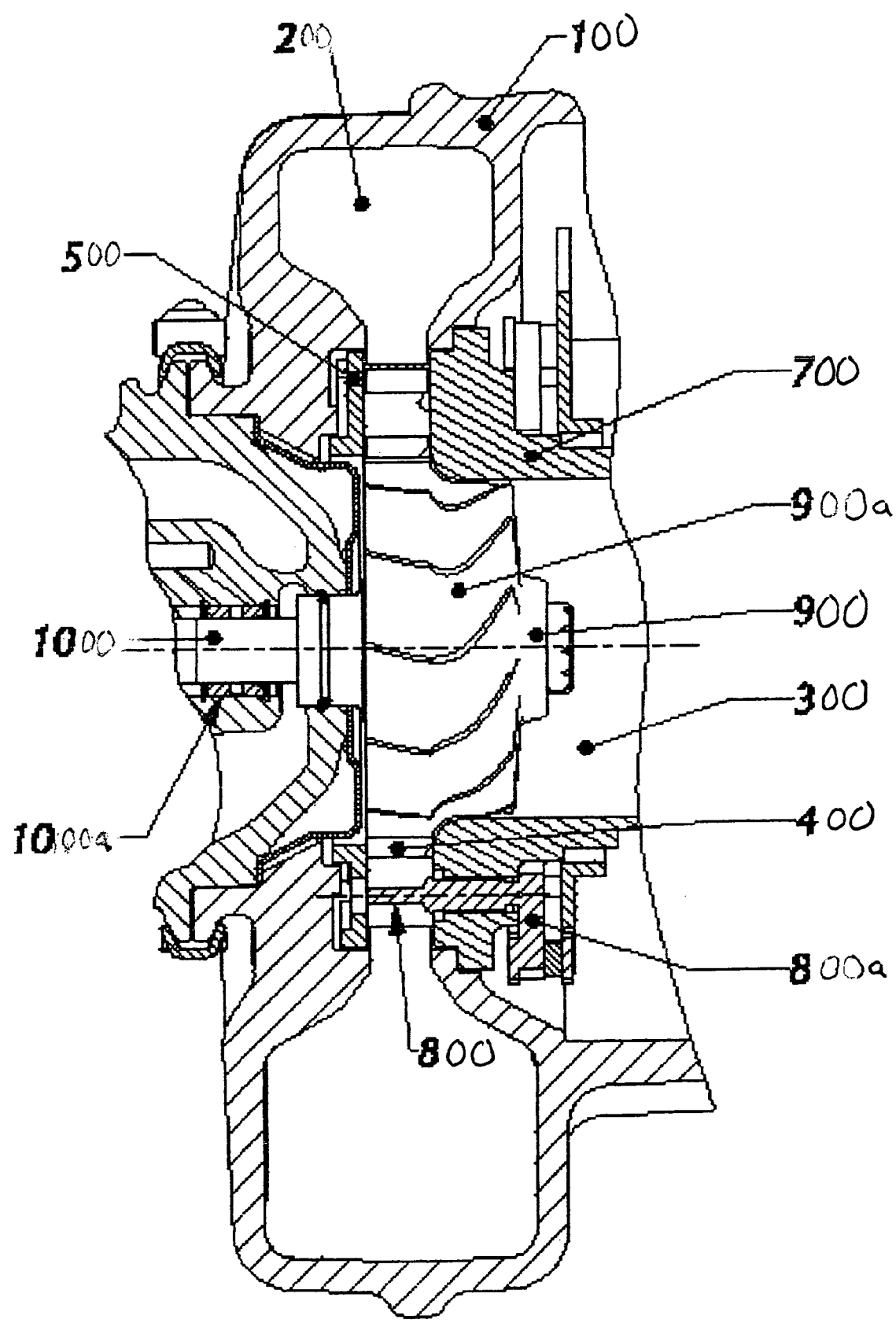
FIG. 6 is an enlarged partial view of the turbine of FIG. 5 showing the vanes in the open position.

It is also known to seal the nozzle ring with respect to the housing by locating inner and/or outer seal rings within locating grooves provided on the nozzle ring rather than locating grooves provided within the housing. In this case the seal ring(s) will move with the nozzle ring. Specifically, FIGS. 4a and 4b illustrate the nozzle ring/inlet passageway region of the turbine disclosed in European patent number 0 654 587 modified in accordance with the present application. Where appropriate, the same reference numerals are used in FIGS. 4a and 4b as are used above. As with the turbine arrangement of FIGS. 3a and 3b, the nozzle vanes 10 are supported by the nozzle ring 8 and extend across the inlet passageway 6, through a shroud plate 34 and into a cavity 33. Pressure balancing apertures 35 are provided through the radial wall 7 of the nozzle ring 8, which is sealed with respect to the cavity 22 by inner and outer ring seals 26 and 37. However, whereas the seal ring 26 is located within a groove provided in the housing 3, the radially outer seal ring 37 is located within a groove 38 provided within the outer annular flange 21 of the nozzle ring 8 and thus moves as the nozzle ring moves.

In accordance with the present application the inner annular flange 20 of the nozzle ring 8 is provided with inlet bypass apertures 32 which pass the seal ring 26 as the nozzle ring moves to close the inlet passageway 6 to a minimum (as illustrated in FIG. 4b). However, the outer inlet bypass path is provided not by apertures through the nozzle ring, but by a circumferential array of recesses 39 formed in the outer annular portion 25 of the opening 23 of cavity 22. As can be seen from FIG. 4a, under normal operating conditions the seal ring 37 will be disposed inward of the recesses 39 preventing the passage of exhaust gas around the nozzle ring 8 and through the cavity 22. However, as the nozzle ring moves to close the inlet passageway 6 to a minimum, as shown in FIG. 4b, the seal ring 37 moves into axial alignment with the recesses 39 which thereby provide a bypass path around the seal ring 37 to allow gas to flow through the cavity 22, and to the turbine wheel via the inlet bypass apertures 32 provided in the inner annular flange of the nozzle ring 8. It will be appreciated that the effect of the recesses 39 is directly equivalent to the effect of apertures 32 and that in operation this embodiment of the invention will function in substantially the same way as the other embodiments of the invention described above.

It will be appreciated that modifications may be made to the embodiments of the invention described above. For instance, if only one seal ring is required as for example in embodiment of FIG. 8, and this is located on the nozzle ring, then there will be no need to provide aperture 32 in the inner flange of the nozzle ring. Similarly, if there are both inner and outer seal rings located in the housing, it will be necessary to provide bypass recesses in both the inner and outer annular portions of the housing instead of bypass apertures through the nozzle ring.

With respect to the embodiments of the present application illustrated in FIGS. 1–4, it should be appreciated that the exhaust gas flow bypassing the nozzle ring 8 is discharged into the rest of the exhaust fluid flow passing from the inlet passage in an interfering relationship. The exhaust gas flow bypassing the nozzle ring enters the exhaust flow from the nozzle ring at a steep angle, or substantially perpendicularly.

With reference to FIGS. 5–11 there is illustrated a swing vane type variable geometry turbine. The present application incorporates herein by reference British Patent Application No. 0407978.6 filed Apr. 8, 2004. A swing vane type variable geometry turbine includes guide vanes upstream of the turbine wheel that are adjustable to control the cross-sectional flow area to the turbine wheel. Turning the guide vanes so that their chords are essentially radial to the turbine wheel increases the distance between them, the so called throat. Turning the vanes so their chords are essentially tangential to the turbine wheel reduces the throat distance between them. The product of the throat dimension and the fixed axial length of the vanes determines the flow area of any given vane angle.

With further reference to FIGS. 5–11, there is illustrated the variable geometry turbine comprising a turbine housing 100 including a volute or inlet chamber 200 to which exhaust gas from an internal combustion engine (not shown) is delivered. The exhaust gas flows from the inlet chamber 200 to an outlet passageway 300 via an annular radially directed inlet passageway 400 defined on one side by an annular wall member 500 and on the opposite side by a radially extending annular sleeve 700. In this annular sleeve 700 an array of circumferentially spaced vanes 800, each of which extends across the inlet passageway are supported in such a way that they may be simultaneously rotated through rotation of a lever 800a.

Exhaust gas flowing from the inlet chamber 200 to the outlet passageway 300 passes over a plurality of blades 900a of a centripetal turbine wheel 900 and as a result torque is applied to a turbocharger shaft 1000 (journaled by means of bearings 1000a) which drives a centrifugal compressor wheel 1100. Rotation of the compressor wheel 1100 pressurizes ambient air present in an air inlet 1200 and delivers the pressurized air to an air outlet or volute 1300 from which it is fed to an internal combustion engine (not shown). The rotational speed of the turbine wheel 900 is dependent upon the velocity of the gas passing through the annular passageway 400. For a fixed rate of flow of exhaust gas, the gas velocity is a function of the throat width of the passageway between adjacent vanes, which can be adjusted by controlling the angles of the vanes 800.

Figure 8:
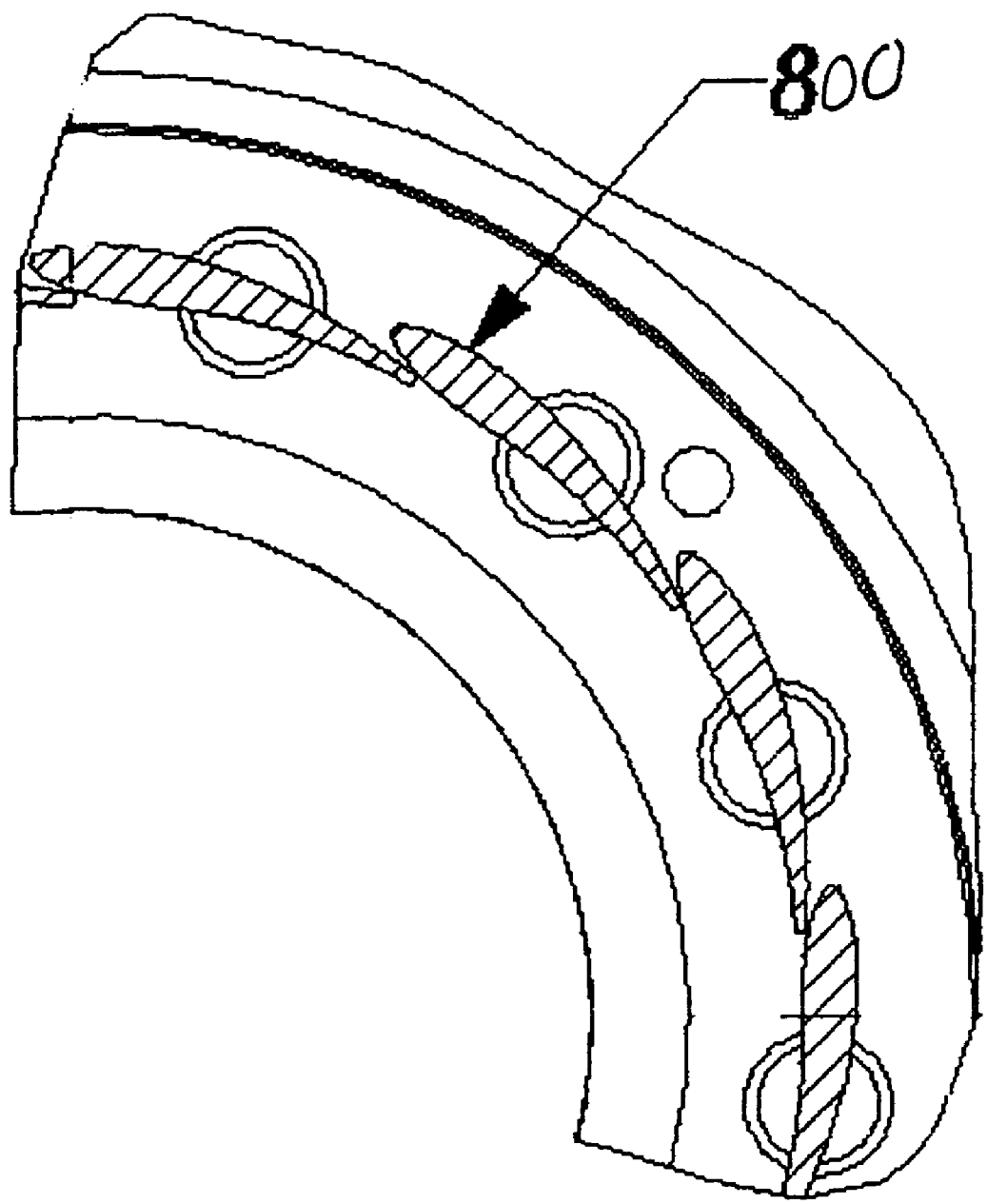
FIG. 8 is an end elevation of the vanes around the turbine wheel in a closed position.
Figure 9:
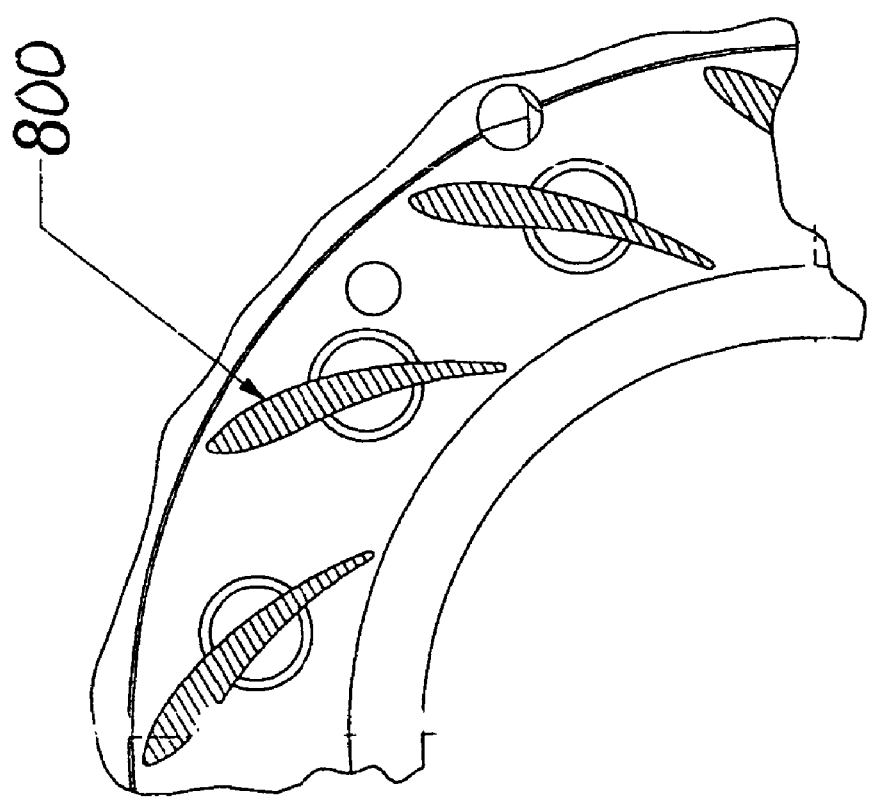
FIG. 9 is an end elevation of the vanes around the turbine wheel in an open position.

With reference to FIG. 8, there is illustrated the vanes 800 in the annular inlet passageway 400 closed down to a minimum throat width. In the vane state set forth in FIG. 8, some of the exhaust gas bypasses the vanes 800 by flowing around the vanes through pockets and/or any geometrical changes in the sidewalls. With reference to FIG. 9, there is illustrated the vanes 800 in a substantially open state. As the width of the throat between vanes 800 is reduced the velocity of the gas passing through them increases. The bypassing of the vanes within the inlet passageway 400 reduces the efficiency of the turbine.

The movement of the vanes 800 may be controlled by any suitable actuation means applied to the attached levers 800a, such as, for instance the links 1400. The vanes are preferably constrained to move together in unison by a ring that engages them all by the levers or interconnecting links. A master link may be attached to an actuator (not illustrated) which could be a pneumatic, electric or hydraulic device.

Figure 7:
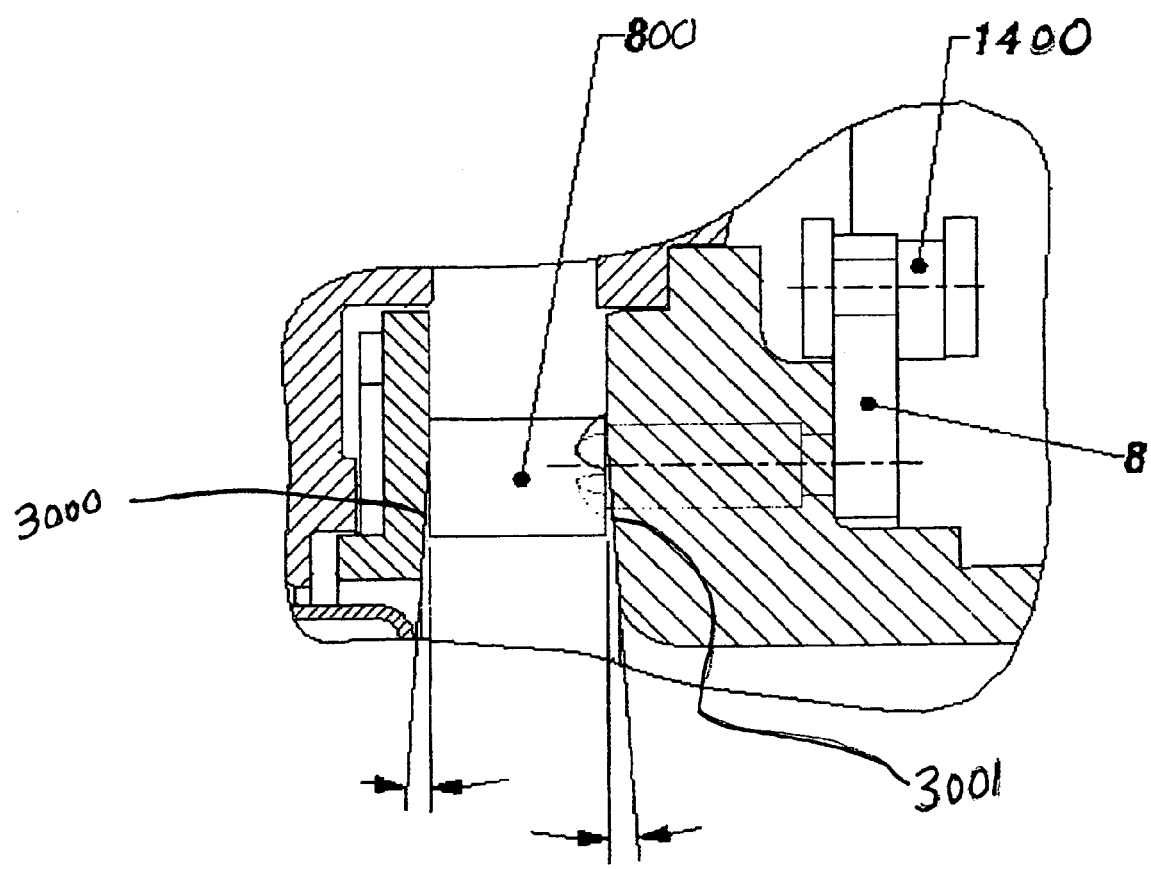
FIG. 7 is an enlarged view of the vanes in FIG. 6 showing one embodiment of the sidewalls.

With reference to FIG. 7, there is illustrated one embodiment of the present invention wherein one or both of the sidewalls 3000 and 3001 are tapered in an axi-symmetrical way. The taper of the sidewalls allows a portion of the exhaust gas to flow around the vanes and effectively bypass the nozzle vane. As the vanes 800 swing from a closed state to an open state their trailing edge moves radially inwards towards the turbine wheel inlet. The taper on the sidewall is designed so that the width between the sidewalls 3000 and 3001 increases the further they get towards the turbine wheel. With reference to the embodiment of FIG. 7, there is illustrated a linear taper. However, the present invention is not limited to linear tapers nor that both sidewalls are tapered. In one embodiment with the vanes in the open position the clearance will be at a maximum, and as the vanes close the side clearance will be reduced to the minimum allowable running clearance. The present invention contemplates that the rate of taper and the radial position of the start of the taper can be chosen to tailor the specific characteristics of the engine.

Figure 10:
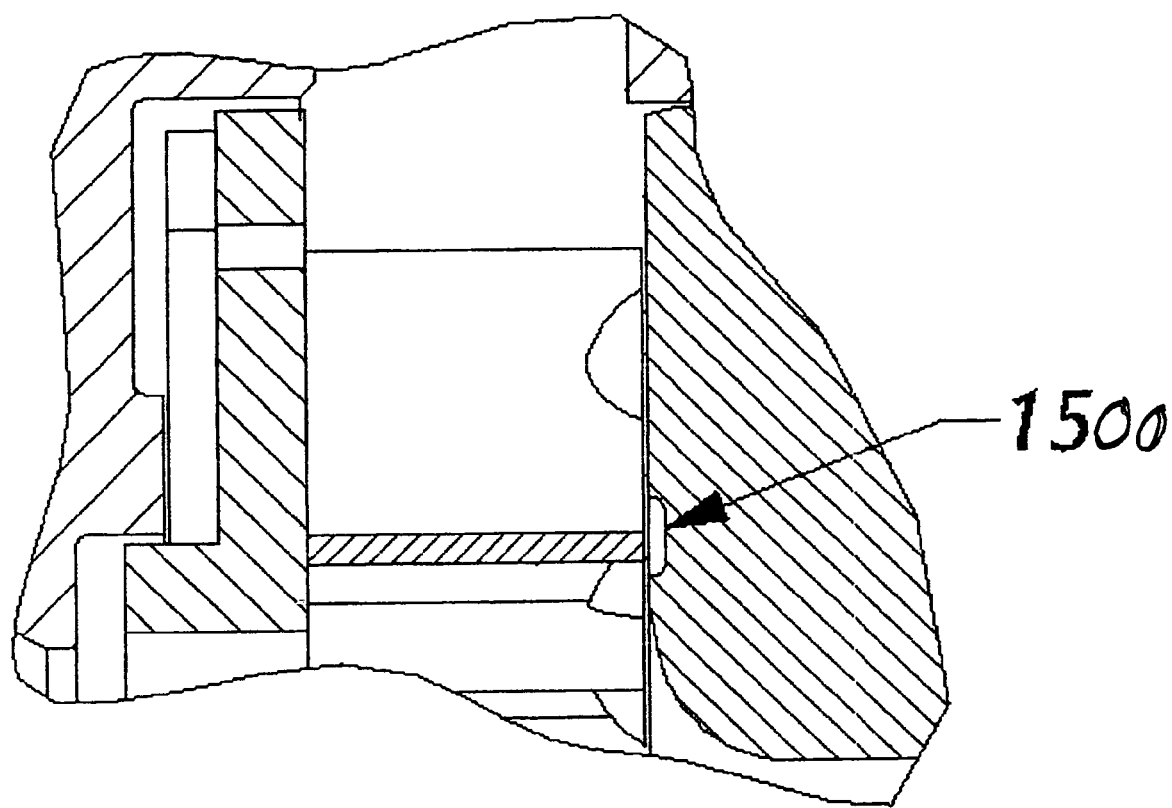
FIG. 10 is a sectional side elevation of another form of the present invention comprising troughs in one of the sidewalls.
Figure 11:
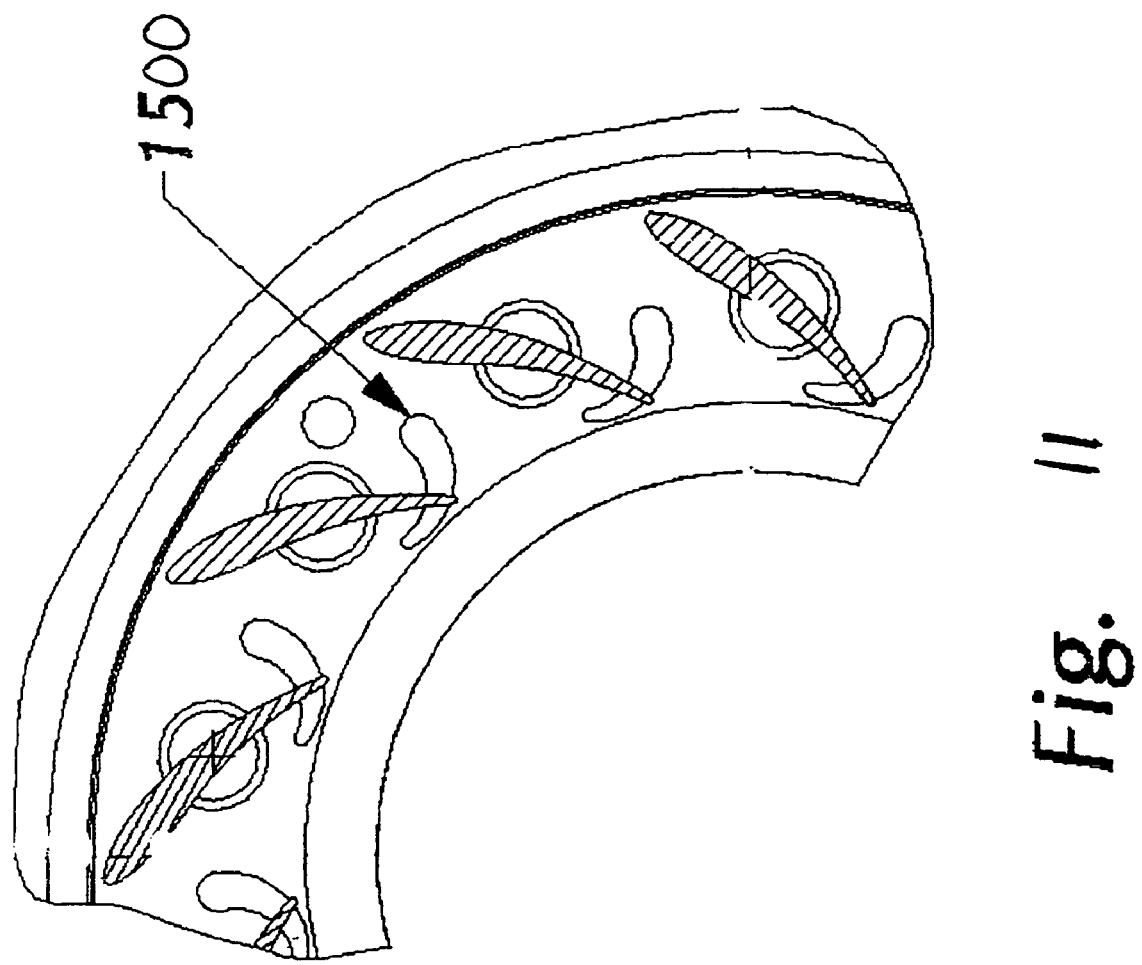
FIG. 11 is an end elevation of the vanes in an intermediate position and showing the troughs in a sidewall.

With reference to FIGS. 10 and 11 there is illustrated one embodiment of a system having a greater degree of flexibility then the prior embodiments. The embodiment of FIGS. 10 and 11 includes a vane 800 having associated therewith a discrete pocket 1500. The discrete pocket 1500 can be located in one or both of the sidewalls. In one form the pockets 1500 take the substantial form of a sector over which the vanes 800 sweep over as they are rotated. In one form each of the plurality of vanes has associated therewith a pocket. The start and stop of fluid flow through the pocket 1500 can be manipulated by positioning of the leading and trailing edges of the pocket. The magnitude of the fluid flow through the pocket can be manipulated by the width and depth of the pocket. The pockets allow for the passage of a portion of the exhaust gas around the outer surface of the vane, thereby bypassing flow through the vanes in the nozzle stage. A variety of shapes for the pockets are contemplated herein to meet the design parameters for the turbine. The pockets 1500 which are generally exposed to the exhaust gas flow during the normal engine operating range have little effect during this period because there is not created a substantially enclosed passageway around at least a portion of the vane. During the opening of the vanes to the exhaust gas heating location the pockets are exposed to the exhaust gas flow. A portion of the exhaust gas flows through the pockets and bypasses around the vanes 10 located within the inlet passageway 400.

The systems for some variable geometry turbines have been described above with reference to FIGS. 1–11. While the present application is preferably applicable to controlling the types of variable geometry turbines described above it should be understood that the present inventive methods are applicable to controlling a great variety of other types of variable geometry turbines. The present invention relies upon controlling the exhaust gas temperature by changing the size of the exhaust passage and bypassing a portion of the exhaust gas flow around the vanes within the inlet passageway of the turbocharger.

In variable geometry turbine systems utilising a nozzle ring the nozzle ring is moved axially to close down the size of the inlet passageway in response to the temperature within the after-treatment system being below a threshold temperature. The temperature within the after treatment system is determined by the temperature detector. In one form the temperature of the exhaust gas is queried at a plurality of closely timed intervals, and in another form the detecting of temperature is almost continuous. However, determining the time intervals for detecting are believed to be within the skill of a person or ordinary skill in the art. Upon the temperature within the after-treatment system being determined to be below a threshold temperature the nozzle ring is moved axially to an exhaust gas heating location below that required for normal engine operation. At the exhaust gas heating location the nozzle ring is maintained for a period of time until the detected temperature is at or above the threshold temperature. With the nozzle ring positioned at the exhaust gas heating location the bypass passages are exposed to the exhaust gas flow and exhaust gas bypasses around the backface or under the nozzle to bypass the vanes.

The axial movement of the nozzle ring results in a decreased flow area in the inlet passageway and the uncovering of the bypass passages allows exhaust gas to flow around the nozzle. The result is a reduction in the turbine stage efficiency and causes the airflow to be reduced and increase the pumping work of the engine to maintain a desired power level. In one form the desired power level is that level established prior to the determination to increase the exhaust gas temperature. In one form the resulting exhaust gas temperature is increased significantly above the threshold temperature.

With reference to the system in FIGS. 2a and 2b, the exhaust gas flows from the inlet chamber 4 to the turbine wheel 12 via the cavity 22 rather than through the inlet passageway 6. With reference to the system in FIGS. 3a and 3b, the system includes passages 32a that open into flow communication with the inlet passageway side of seal ring 26. The exhaust gas bypasses through the passages 32a to the cavity 22 and from there to the turbine wheel 12. With reference to FIGS. 4a and 4b, there is illustrated a system wherein the nozzle ring moves to close the inlet passageway 6 to a minimum width for exhaust gas heating and the seal ring 37 is brought into alignment with recess 39. Thereby establishing a bypass path around seal ring 37 to cavity 22 for passage of the exhaust gas.

With reference to the systems utilising a swing vane type variable geometry turbine the plurality of vanes are moved in unison to close down the size of the inlet passageway in response to the temperature within the after-treatment system being below a threshold temperature. The temperature detector determines the temperature within the after-treatment system. In one form the temperature of the exhaust gas is queried at a plurality of closely timed intervals, and in another form the detecting of temperatures is almost continuous. However, determining the time intervals for detecting the temperature is believed to be within the skill of a person or ordinary skill in the art. Upon the temperature being determined to be below a threshold value the vanes are rotated to an exhaust gas heating location that defines a flow path smaller than is required for normal engine operation. At the exhaust gas heating location the vanes are maintained at this position until the temperature reaches the threshold temperature. With the plurality of vanes positioned at the exhaust gas heating location at least a portion of the exhaust gas flows around/bypasses bypassing the vanes as it flow to the turbine wheel.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method comprising:
    flowing an exhaust gas to a turbocharger including a variable geometry turbine with a nozzle ring and a plurality of guide vanes within an inlet passage of the turbine;
    discharging a portion of the exhaust gas through at least one aperture in a radial face of the nozzle ring;
    moving the nozzle ring within the inlet passage to reduce the flow area in the inlet passage and place at least one outlet in the nozzle ring in flow communication with a turbine wheel; and
    passing the portion of the exhaust gas through the at least one outlet and to the turbine wheel while bypassing the guide vanes.

2. The method of claim 1, wherein in said moving the nozzle ring is positioned at a location within the inlet passage to define a fluid flow area that is smaller than a fluid flow area for normal engine operating conditions.

3. The method of claim 2, wherein in said passing the portion of the exhaust gas flows entirely within the turbocharger.

4. The method of claim 1, wherein in said passing the portion of the exhaust gas enters the rest of the exhaust gas flowing to the turbine wheel at one of a steep angle and substantially perpendicular thereto.

5. The method of claim 1, which further includes passing exhaust gas to an after-treatment system;
    which further includes determining the temperature of the exhaust gas passing to the after-treatment system; and
    which further includes operatively controlling said moving based upon whether the temperature of the exhaust gas satisfies a threshold temperature condition.

6. The method of claim 1, wherein the plurality of guide vanes are fixed with the nozzle ring.

7. The method of claim 1, wherein the plurality of guide vanes are not fixed with the nozzle ring.

8. The method of claim 1, wherein the plurality of guide vanes are fixed with the nozzle ring;
   wherein in said moving the nozzle ring is positioned at a location within the inlet passage to define a fluid flow area that is smaller than a fluid flow area for normal engine operation;
   which further includes passing exhaust gas to an after-treatment system;
   which further includes determining the temperature of the exhaust gas passing to the after-treatment system;
   which further includes operatively controlling said moving based upon whether the temperature of the exhaust gas satisfies a threshold temperature; and
   wherein in said passing the portion of the exhaust gas flows entirely within the turbocharger.

9. A variable geometry turbocharger comprising:
   a housing having an exhaust gas inlet flow path;
   a turbine wheel rotatable in said housing;
   an annular nozzle ring located within said housing and having a radial wall member, an inner wall member and an outer wall member, said radial wall member having an exhaust gas inlet opening for a passage of exhaust gas into a volume defined by said wall members, said inner wall member having an exhaust gas outlet; and
   an actuator coupled with said nozzle ring and operable to change the position of the nozzle ring within said exhaust gas inlet flow path, wherein in one mode said actuator moves said nozzle ring to an exhaust gas heating location and places said exhaust gas outlet in flow communication with a passageway to said turbine wheel.

10. The variable geometry turbocharger of claim 9, wherein said passageway is defined between an inner surface of said inner wall member and a portion of said housing.

11. The variable geometry turbocharger of claim 10, wherein said passageway increases the back pressure on the exhaust gas in said passageway.

12. The variable geometry turbocharger of claim 9, wherein the exhaust gas inlet flow path has a maximum width, and wherein said exhaust nozzle ring when in said exhaust gas heating location is at a location within a range of about zero percent to about twenty-five percent of the maximum width.

13. The variable geometry turbocharger of claim 9, wherein said annular ring includes a plurality of guide members connected therewith; and wherein said passageway routes exhaust gas around the plurality of guide members.

14. The variable geometry turbocharger of claim 9, wherein with said nozzle ring at said heating location the efficiency of the turbine is reduced.

15. The variable geometry turbocharger of claim 9, wherein said passageway is defined between an inner surface of said inner wall member and a portion of said housing;
   wherein said passageway increases the back pressure on the exhaust gas flowing from said exhaust gas outlet;
   wherein the exhaust gas inlet flow path has a nominal width for normal operating conditions, and wherein said exhaust nozzle ring when in said exhaust gas heating location defines a width for fluid flow smaller than said nominal width;
   wherein said annular ring includes a plurality of guide members connected therewith; and
   wherein said passageway routes exhaust gas around the plurality of guide members.

16. A system comprising:
   an after-treatment system for an internal combustion engine;
   a variable geometry turbocharger including a turbine having a housing with an exhaust gas inlet flow path and an exhaust gas outlet flow path in fluid flow communication with said after-treatment system, said turbine including a nozzle ring having a radial wall, an inner wall, and an outer wall, said radial wall having an exhaust gas inlet opening for the a passage of exhaust gas into a volume defined by said walls, said inner wall having an exhaust gas outlet opening for passage of exhaust gas from said volume; and
   an actuator coupled with said nozzle ring and operable to change the position of said nozzle ring within said exhaust gas inlet flow path, said actuator operable to move said nozzle ring to reduce the size of the fluid flow area in the exhaust gas inlet flow path from a normal size for engine operation to a reduced size for exhaust gas heating and place said exhaust gas outlet in flow communication with said after-treatment system.

17. The system of claim 16, wherein said after-treatment system is a $No_x$ after-treatment system.

18. The system of claim 16, wherein said outer wall does not have an aperture for exhaust gas flow; and
   wherein said nozzle ring includes a plurality of guide vanes; and the exhaust gas passing through said exhaust gas outlet bypasses said plurality of guide vanes.

* * * * *